United States Patent
Chu et al.

(10) Patent No.: US 11,367,367 B2
(45) Date of Patent: Jun. 21, 2022

(54) REEL TYPE DISPLAY DEVICE AND REEL STRUCTURE

(71) Applicant: BOE TECHNOLOGY GROUP CO., LTD., Beijing (CN)

(72) Inventors: Shangchieh Chu, Beijing (CN); Xiaofei Luo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 182 days.

(21) Appl. No.: 16/912,777

(22) Filed: Jun. 26, 2020

(65) Prior Publication Data
US 2020/0410908 A1  Dec. 31, 2020

(30) Foreign Application Priority Data
Jun. 28, 2019 (CN) .......................... 201910579152.4

(51) Int. Cl.
*G09F 9/30* (2006.01)
*B65H 75/44* (2006.01)
(Continued)

(52) U.S. Cl.
CPC .......... *G09F 9/301* (2013.01); *B65H 75/4465* (2013.01); *G06F 1/1652* (2013.01); *G06F 3/0412* (2013.01)

(58) Field of Classification Search
CPC ...... G09F 9/301; G06F 1/1652; G06F 3/0412; B65H 75/38; B65H 75/4402; B65H 75/4457; B65H 75/4465; B65H 75/4481
See application file for complete search history.

(56) References Cited

U.S. PATENT DOCUMENTS

| 2007/0241002 A1* | 10/2007 | Wu ...................... G06F 1/1601 |
| | | 206/150 |
| 2015/0047796 A1* | 2/2015 | Peng ..................... E06B 9/42 |
| | | 160/323.1 |

(Continued)

FOREIGN PATENT DOCUMENTS

| CN | 201655172 U | 11/2010 |
| CN | 105979037 A | 9/2016 |

(Continued)

OTHER PUBLICATIONS

First Office Action for CN Patent Application No. 201910579152.4 dated Nov. 3, 2020.

*Primary Examiner* — Joe H Cheng
(74) *Attorney, Agent, or Firm* — Thomas | Horstemeyer LLP (57) ABSTRACT

A reel type display device includes a shell with an accommodating space and an opening; a rotation shaft rotatably disposed in the accommodating space; a flexible screen having a connecting end connected to the rotation shaft and a retractable end configured to be retractable relative to the opening; and a driving mechanism, wherein two grooves opposite to each other are formed on an inner surface of the shell and extend along a second direction, and two end portions of the rotation shaft are in sliding fit with the two grooves, respectively. The driving mechanism is configured to drive the rotation shaft to translate along the two grooves according to a retractable state of the flexible screen, so that the portion of the flexible screen unwound from the rotation shaft extends along a first direction, wherein the second direction is perpendicular to a central axis direction of the rotation shaft.

20 Claims, 3 Drawing Sheets

(51) Int. Cl.
*G06F 1/16* (2006.01)
*G06F 3/041* (2006.01)

(56) References Cited

U.S. PATENT DOCUMENTS

| | | | | |
|---|---|---|---|---|
| 2015/0340004 | A1* | 11/2015 | Pang | G09G 5/00 345/205 |
| 2016/0139633 | A1* | 5/2016 | Lee | G06F 1/1652 345/33 |
| 2016/0161983 | A1* | 6/2016 | Lee | G09F 9/301 361/749 |
| 2016/0239050 | A1* | 8/2016 | Kim | G06F 1/1652 |
| 2016/0363960 | A1* | 12/2016 | Park | G09F 9/301 |
| 2017/0196102 | A1* | 7/2017 | Shin | G06F 1/1607 |
| 2018/0228036 | A1 | 8/2018 | Mou et al. | |
| 2018/0341142 | A1 | 11/2018 | Choi et al. | |
| 2019/0053387 | A1 | 2/2019 | Choi et al. | |
| 2019/0317556 | A1* | 10/2019 | Zhang | G06F 1/1652 |
| 2020/0029451 | A1* | 1/2020 | Ran | H05K 5/0017 |
| 2020/0221586 | A1* | 7/2020 | Gao | G09G 5/373 |

FOREIGN PATENT DOCUMENTS

| | | |
|---|---|---|
| CN | 107820403 A | 3/2018 |
| KR | 20190066682 A | 6/2019 |
| TW | 200741614 A | 11/2007 |
| WO | 2005091110 A1 | 9/2005 |

\* cited by examiner

REEL TYPE DISPLAY DEVICE AND REEL STRUCTURE

CROSS REFERENCE TO RELATED APPLICATIONS

This application is based upon, and claims the benefit of and priority to, Chinese Patent Application No. 201910579152.4, filed on Jun. 28, 2019, the contents of which being incorporated by reference in its entirety herein.

TECHNICAL FIELD

This disclosure relates to the technical field of display devices and, in particular, to a reel type display device and a reel structure.

BACKGROUND

A flexible display screen in a reel type display can be retractable. The flexible display screen is drawn out when in use, and drawn in after use. The display device can be used for mobile phones, televisions and the like, and a display picture can be remarkably enlarged.

SUMMARY

According to one aspect of the present disclosure, a reel type display device includes a shell with an accommodating space and an opening; a rotation shaft rotatably disposed in the accommodating space of the shell; a flexible screen having a connecting end connected to the rotation shaft and a retractable end configured to be retractable relative to the opening; and a driving mechanism. Two grooves opposite to each other are formed on an inner surface of the shell. The two grooves extend along a second direction, and two end portions of the rotation shaft are in sliding fit with the two grooves, respectively. The driving mechanism is configured to drive the rotation shaft to translate along the two grooves according to a retractable state of the flexible screen, so that the portion of the flexible screen unwound from the rotation shaft extends along a first direction, wherein the second direction is perpendicular to a central axis direction of the rotation shaft.

According to one of the embodiments of the present disclosure, the first direction is perpendicular to the second direction.

According to one of the embodiments of the present disclosure, a length of the groove in the second direction is equal to or slightly greater than or slightly less than an overall thickness of the flexible screen, and the overall thickness is a sum of thicknesses of layers of the flexible screen overlapped to one another after the flexible screen is completely wound on the rotation shaft.

According to one of the embodiments of the present disclosure, each of the two grooves has a first end and a second end in the second direction, and the first end is at a center line of the shell.

According to one of the embodiments of the present disclosure, the second end is on a side of the center line of the shell facing the opening.

According to one of the embodiments of the present disclosure, the shell includes a tube; and two end plates respectively and fixedly connected with two end portions of the tube, wherein the two grooves are formed on the two end plates, respectively.

According to one of the embodiments of the present disclosure, the reel type display device further includes an extension tube extending along the first direction and having two ends. One end of the extension tube connects with the shell and communicates with the accommodating space, and the other end is an opening end. The opening is at the opening end of the extension tube.

According to one of the embodiments of the present disclosure, the end portions of the rotation shaft are made of magnetic materials. The driving mechanism comprises a magnetic assembly configured to control the end portions of the rotation shaft to slide along the groove by a magnetic field.

According to one of the embodiments of the present disclosure, the reel type display device further includes an elastic member connected between the rotation shaft and the shell, the elastic member being configured to provide elastic restoring force when the rotation shaft rotates along with extension of the flexible screen.

According to one of the embodiments of the present disclosure, the elastic member comprises a torsion spring.

According to one of the embodiments of the present disclosure, the flexible screen includes a composite film layer, comprising a bottom film, a display screen, a touch screen, a polaroid, and an optical adhesive layer sequentially laminated; and a cover film on a side of the optical adhesive layer facing away from the polaroid.

According to one of the embodiments of the present disclosure, an area of the cover film is larger than an area of the composite film layer, such that the cover film extends out of an edge of the composite film layer respectively on both sides of the first direction. The portions of the cover film extending out of the composite film layer are respectively provided with adhesive layers. The adhesive layers and the composite film layer are positioned on the same side of the cover film, and one end of the adhesive layer connects the connecting end of the flexible screen to the rotation shaft.

According to one of the embodiments of the present disclosure, an area of the cover film is larger than an area of the composite film layer, and the cover film extends out of an edge of the composite film layer respectively on both sides of the first direction. The reel type display device further comprises a handle structure at a retractable end of the flexible screen, where the portions of the cover film extending out of the composite film layer are respectively provided with adhesive layers, and one end of the adhesive layer connects the handle structure to the retractable end of the flexible screen.

According to one of the embodiments of the present disclosure, the reel type display device further includes a folding bracket foldably disposed between the retractable end of the flexible screen and the shell, where the folding bracket is configured to support the portion of the flexible screen extending out of the opening; or a handle structure at the retractable end of the flexible screen.

According to another aspect of the present disclosure, a reel structure includes a shell with an accommodating space and an opening, and a rotation shaft rotatably disposed in the accommodating space of the shell, where two grooves opposite and parallel to one another are formed on an inner surface of the shell, and two end portions of the rotation shaft are respectively in sliding fit with the two grooves.

According one of embodiments of the present disclosure, each of the two grooves has a first end at a center line of the shell and a second end at a side of the center line of the shell facing the opening.

According one of embodiments of the present disclosure, the shell includes a tube; and two end plates respectively and fixedly connected with two end portions of the tube, wherein the two grooves are formed on the two end plates, respectively.

According one of embodiments of the present disclosure, the reel structure further incudes an extension tube, having one end connected with the shell and communicated with the accommodating space, and the other end being an opening end, wherein the extension tube extends away from the shell, and the opening is at the opening end of the extension tube.

According one of embodiments of the present disclosure, the reel structure further includes an elastic member connected between the rotation shaft and the shell, the elastic member being configured to provide an elastic restoring force.

According one of embodiments of the present disclosure, the end portions of the rotation shaft are made of magnetic materials; wherein the driving mechanism includes a magnetic assembly configured to control the end portions of the rotation shaft to slide along the grooves by a magnetic field.

BRIEF DESCRIPTION OF THE DRAWINGS

Various objects, features and advantages of the present disclosure will become more apparent from the detailed descriptions of exemplary embodiments of the present disclosure with reference with the accompanying drawings. Understandably, the drawings are merely schematic illustrations of the present disclosure and are not necessarily drawn to scale. In the drawings, the same reference numerals refer to the same or similar components throughout the present disclosure. In the drawings.

DETAILED DESCRIPTION

Typical embodiments embodying features and advantages of this disclosure will be set forth below in detail. It should be understood that various modifications may be made in different embodiments without departing from the scope of this disclosure, where the specification and drawings in essential are used for description but not limit to this disclosure.

Hereinafter, various exemplary embodiments of the present disclosure will be described with reference to the drawings constituting a part of the present disclosure, in which different exemplary structures, systems, and steps of various aspects of the present disclosure can be realized in an exemplary example. It should be understood that other specific technical solutions of the components, structures, exemplary devices, systems, and steps may be used and can be structurally and functionally modified without departing from the scope of the present disclosure. Moreover, although the terms "above," "between," "within," etc. may be used in this specification to describe different exemplary features and elements of the present disclosure, these terms are used herein only for convenience, for example, the exemplary direction as described according to the drawings. It should not be understood from any content of the specification that a particular three-dimensional direction requiring a structure falls within the scope of the present disclosure.

Figure 1:
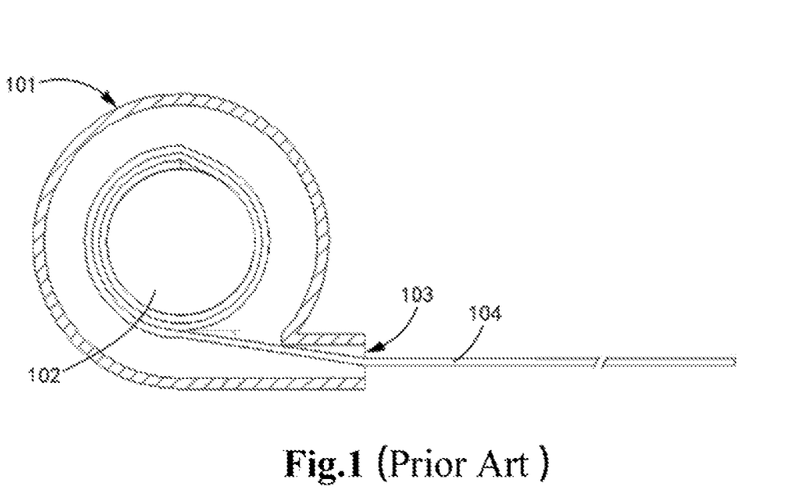
FIG. 1 is a partial sectional view of a reel type display device in the related art.

As shown in FIG. 1, a partial sectional view of a reel type display device in the related art is representatively shown. The reel type display device mainly includes a reel 101 and a flexible screen 104, where a rotation shaft 102 is arranged in the reel 101. An opening 103 is formed in the reel 101. The flexible screen 104 is wound on the rotation shaft 102, and the flexible screen 104 has one end connected to the rotation shaft 102 and the other end that is retractable through the opening 103. However, during use of the reel type display device, when a part of the flexible screen is drawn out, the overall thickness of the flexible screen wound on the rotation shaft is reduced, and the relative positions of the rotation shaft and the opening are fixed so that friction is generated between the flexible screen and the opening or the inner surface of the reel, which leads to various problems, such as scratching the flexible screen.

The present disclosure provides a reel type display device and a reel structure that are capable of preventing the flexible screen from generating friction with the opening or the inner surface of the reel during expansion and contraction of the flexible screen.

Figure 3:
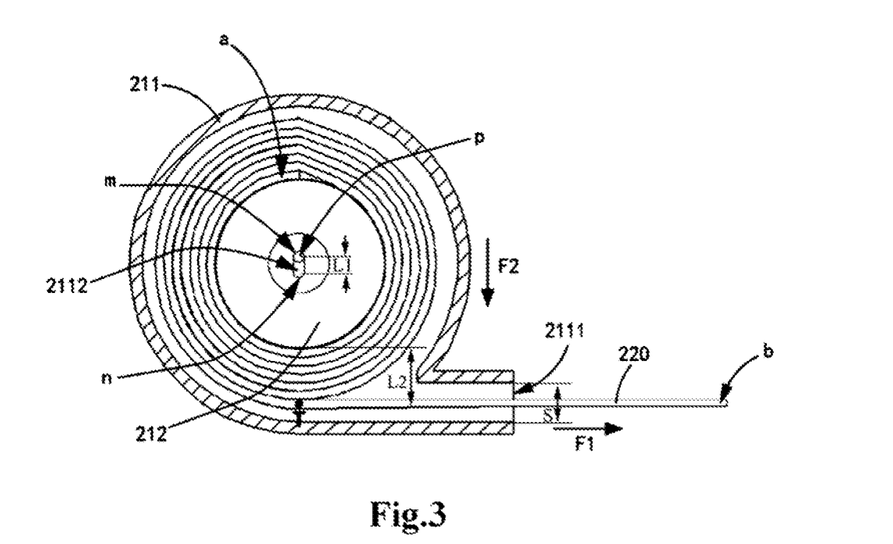
FIG. 3 is a partial sectional view of the reel type display device shown in FIG. 2 in a state.

Referring to FIG. 3, the reel structure proposed in the present disclosure includes a shell 211 and a rotation shaft 212. The shell 211 has an accommodating space and an opening 2111. The rotation shaft 212 is rotatably disposed in the accommodating space of the shell 211. Two grooves 2112 opposite and parallel to one another are formed on the inner surface of the shell 211, and both end portions of the rotation shaft 212 are in a sliding fit with the two grooves 2112, respectively.

In one embodiment, the groove 2112 has a first end mat a center line of the shell 211 and a second end n on a side of the center line of the shell 211 facing the opening 2111.

In this embodiment, the shell 211 includes a tube body 2113 and two end plates 2114 respectively and fixedly connected to both ends of the tube body 2113. The two grooves 2112 are formed on the two end plates 2114, respectively.

In this embodiment, the reel structure further includes an extension tube 2110. One end of the extension tube is connected to the shell 211 and communicates with the accommodating space of the shell, and the other end of the extension tube is an opening end. The extension tube 2110 extends away from the shell, and the opening 2111 is at the opening end of the extension tube 2110.

In this embodiment, the reel structure further includes an elastic member, such as a torsion spring, connected between the rotation shaft 212 and the shell 211. The elastic member is configured to provide an elastic restoring force.

The reel structure as proposed by the present disclosure can be applied to the reel type display devices in various scenes, such as mobile phones, televisions, e-books, and the like.

Figure 2:
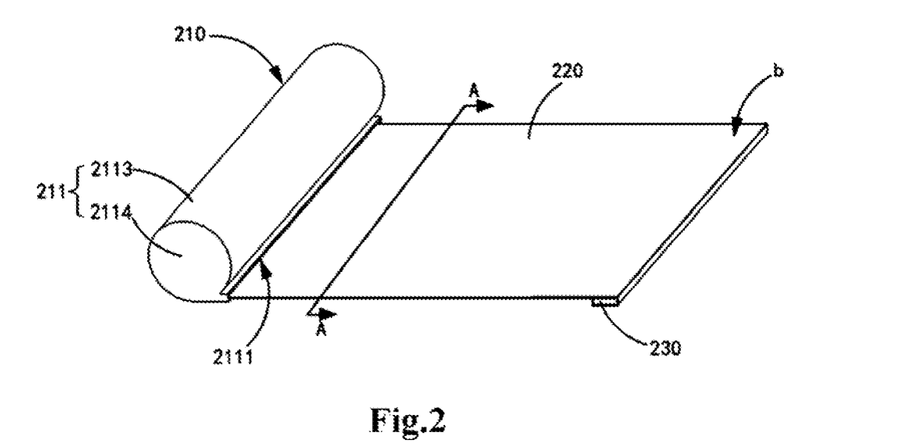
FIG. 2 is a perspective view of a reel type display device according to an exemplary embodiment.

Referring to FIG. 2, a perspective view of a reel type display device proposed in the present disclosure is representatively shown. In this exemplary embodiment, the reel type display device proposed in the present disclosure is described by taking a video assisted playback device as a mobile device. It will be appreciated to those skilled in the art that various modifications, additions, substitutions, deletions, or other changes may be made in the specific embodiments in order to apply the related design of the present disclosure to other types of devices, such as independent video playback devices, and all such changes are still within the principles of the reel type display device proposed in the present disclosure.

Figure 4:
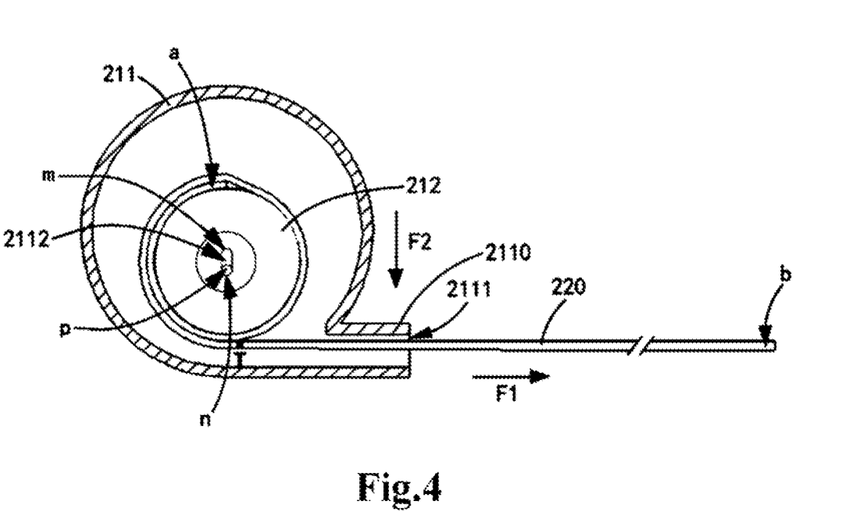
FIG. 4 is a partial sectional view of the reel type display device shown in FIG. 2 in another state.
Figure 5:
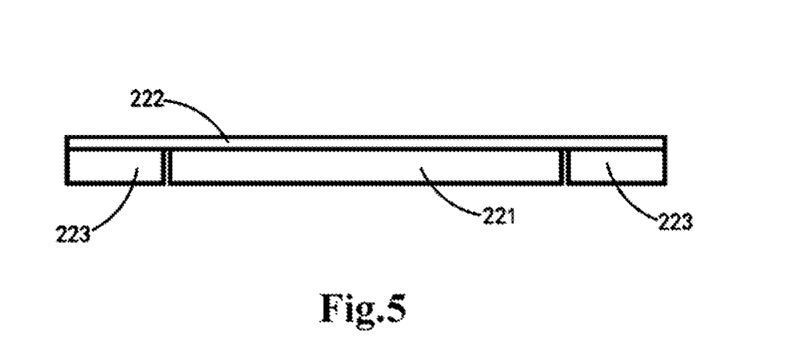
FIG. 5 is a sectional view taken along a line A-A in FIG. 2.

As shown in FIG. 2, in this embodiment, the reel type display device proposed in the present disclosure mainly includes a reel 210, a flexible screen 220, and a driving mechanism. The reel 210 may use the aforesaid reel structure described in the present disclosure. Referring to FIGS. 3 to 5, FIG. 3 representatively shows a partial sectional view of the reel type display device shown in FIG. 2 in a drawn-in state of the flexible screen 220. FIG. 4 representatively shows a partial sectional view of the reel type display device shown in FIG. 2 in a drawn-out state of the flexible screen 220. A sectional view taken along line A-A in FIG. 2 is representatively shown in FIG. 5. The structure, connection mode, and functional relationship of the main components of the reel type display device proposed in the present disclosure will be described in detail below with reference to the above drawings.

As shown in FIGS. 2 to 4, in this embodiment, the reel 210 mainly includes a shell 211 with an accommodating space and a rotation shaft 212. The shell 211 is provided with an opening 2111 along a first direction F1. The rotation shaft 212 is rotatably disposed in the accommodating space of the shell 211. The flexible screen 220 is wound on the rotation shaft 212. The flexible screen 220 has a connecting end a and a retractable end b. The connecting end a of the flexible screen 220 is connected to the rotation shaft 212. The retractable end b of the flexible screen 220 is positioned outside the shell 211 and can be drawn out or drawn in relative to the opening 2111 of the shell 211. Grooves 2112 are respectively formed on positions of the inner surface of the shell 211 corresponding to two shaft ends p of the rotation shaft 212 (i.e., the two end portions of the rotation shaft 212). The grooves 2112 extend along a second direction F2, and the second direction F2 is perpendicular to the first direction F1. The two shaft ends p of the rotation shaft 212 are respectively in sliding fit with the two grooves 2112. The driving mechanism can drive the rotation shaft 212 to slide along the groove 2112 according to the retractable state of the flexible screen 220, so that the portion of the flexible screen 220 unwound on the rotation shaft 212 always remains extended along the first direction F1.

According to the above design, the flexible screen 220 may have a wound portion wound on the rotation shaft 212 and an unwound portion separated from the wound portion. During the extension or retraction of the flexible screen 220, a separation position (i.e., a tangent point T in FIGS. 3 and 4) for separating the wound portion and the unwound portion of the flexible screen 220 is always within height S of the opening 2111, so as to ensure that the flexible screen 220 is always kept in the opening 2111 of the reel 210, for example, at a substantially middle position in a direction of the height of the opening 2111 when the flexible screen is drawn out, to avoid stress concentration and friction scratch at local parts of the flexible screen 220, such as at the position of the tangent point T or at the position corresponding to the opening 2111. It should be noted that, during the retraction of the flexible screen 220, the driving mechanism drives the rotation shaft 212 to slide along the groove 2112, and a sliding direction of the rotation shaft 21 when the flexible screen is drawn in is opposite to a sliding direction of the rotation shaft 212 when the flexible screen 220 is drawn out, so as to ensure that the flexible screen 220 cannot contact the inner surface of the shell or the opening 2111.

It should be noted that in the present embodiment, the extension direction of the groove 2112 is relatively perpendicular to the direction of the opening 2111 of the reel 210, as an example, that is, the first direction F1 and the second direction F2 are relatively perpendicular to each other. As such, a direction where the flexible screen 220 is drawn out is always kept substantially consistent with the tangent direction (i.e., the first direction F1) of the rotation shaft. In other embodiments, the extension direction of the groove 2112 and the direction of the opening 2111 of the reel 210 may also be in other cross arrangement forms, that is, the spatial arrangement positions of the first direction F1 and the second direction F2 may also be in the cross arrangement at other included angles excluding 90 degrees, for example, the angles between the first direction F1 and the second direction F2 are 45°, 60°, 70°, 80°, 100°, 110°, 120°, 130°, 150°, etc., and the included angles between the first direction F1 and the second direction F2 in space are not 0 or 180 degrees, that is, the first direction F1 and the second direction F2 are not parallel to each other.

As shown in FIG. 2, in this embodiment, the shell 211 having a substantially tube-shaped structure is taken as an example. That is, the tube-shaped shell 211 generally includes a tube body 2113 with two end portions and two end plates 2114 respectively closed two end portions of the tube body 2113. The tube body 2113 and the two end plates 2114 enclose the accommodating space. Based on the above design, the rotation shaft 212 is arranged in a direction parallel to an axis of the tube body 2113, and two grooves 2112 are respectively formed on the inner surfaces of the two end plates 2114. The opening 2111 of the shell 211 is on a tangential line along the first direction F1. In other embodiments, the shell 211 may also have other structures, such as a box shape, a sphere shape, an ellipsoid shape, etc., and the present disclosure is not limited thereto.

Based on the design that the shell 211 has a tube-shaped structure, in this embodiment, as shown in FIG. 3, the shell 211 may be a cylinder, for example. In other embodiments, the shell 211 may also have a tube-shaped structure with a section that is rectangular, triangular or other polygonal, and the present disclosure is not limited thereto.

In one embodiment, the reel type display device further includes an extension tube 2110 that extends along the first direction F1. The extension tube 2110 has one end that is connected to the tube body 2113 and communicates with the accommodating space, and the other end of the extension tube 2110 that is an opening end, and the opening 2111 is at the opening end of the extension tube 2110.

As shown in FIGS. 2 to 4, in this embodiment, a length L1 of the groove 2112 in the second direction F2, that is, a maximum sliding stroke of the rotation shaft 212 in the second direction F2, may be, for example, equal to an overall thickness L2 of the flexible screen 220 as being completely wound on the rotation shaft 212. The overall thickness L2 is a sum of the thicknesses of a multiple layers of the flexible screens 220 overlapped to one another as using the reel type display device when the flexible screen 220 is not drawn out, that is when the flexible screen 220 is completely wound on the rotation shaft 212. Such design can ensure that the relative position of the flexible screen 220 to the opening 2111 remains unchanged while the flexible screen is drawn out initially until completely. In other embodiments, the length L1 of the groove 2112 in the second direction F2 may also be greater than the overall thickness L2, and an appropriate maximum stroke may be selected by driving of the driving mechanism, such that it is ensured that the flexible screen 220 cannot contact the opening 2111 or the inner surface of the shell 211 while the flexible screen is drawn out and drawn in. In yet another embodiment, the length L1 of the groove 2112 in the second direction F2 may also be slightly smaller than the overall thickness L2, and at this time, designing the length of the groove 2112 can still at least ensure that the flexible screen 220 cannot contact the opening 2111 or the inner surface of the shell 211 while the flexible screen 220 is drawn out and drawn in.

As shown in FIGS. 2 to 4, in this embodiment, the groove 2112 has a first end m and a second end n in its extension direction (i.e., the second direction F2). For example, the first end m may be at a center of the inner surface of the end plate 2114 of the shell 211, and the second end n may be at one side of the first end m facing the opening 2111 in the second direction F2. Further, when the shell 211 has a substantially tube-shaped structure, that is, when the end plate 2114 is circular, the first end m may be at the center position of the end plate 2114.

In this embodiment, the reel type display device proposed in the present disclosure can control and drive the rotation shaft 212 to move in the second direction F2, for example, in a magnetic drive manner. Specifically, the shaft end p, that is, one end portion of the rotation shaft 212, may be made of magnetic materials, for example. And the driving mechanism may at least include a magnetic assembly capable of providing a magnetic field acting on the rotation shaft 212, and the shaft end p is controlled to slide along the groove 2112 through the magnetic field, thereby controlling the rotation shaft 212 to slide along the groove 2112 (i.e., the second direction F2). In other embodiments, the reel type display device proposed in the present disclosure may also adopt other ways or mechanisms to control and drive the rotation shaft 212 to slide, and the present disclosure is not limited thereto.

Furthermore, as shown in FIG. 2, in this embodiment, the reel type display device proposed in the present disclosure may further include a handle structure 230, for example. Specifically, the handle structure 230 is disposed at a retractable end b of the flexible screen 220. According to such design, when the flexible screen 220 is drawn out by a user, the user can hold the handle structure 230 to apply force, thereby being convenient for operation.

Furthermore, based on the design that the reel-type display device includes the handle structure 230, in this embodiment, the reel-type display device may also include a folding bracket, for example. Specifically, the folding bracket is foldably disposed between the handle structure 230 and the opening 2111. The folding bracket can support the flexible screen 220 when the flexible screen 220 is completely drawn out of the opening 2111, so that the flexible screen 220 can be prevented from being wound and kept in a flat state during use, while the flexible screen 220 can be prevented from being drawn in. In other embodiments, the folding bracket may be provided independently without the handle structure 230, that is, the folding bracket may be disposed between the retractable end b of the flexible screen 220 and the shell 211 of the reel 210, and the present disclosure is not limited thereto.

Furthermore, in this embodiment, the reel type display device proposed by the present disclosure may further include an elastic member, for example. Specifically, the elastic member is connected between the rotation shaft 212 and the shell 211. The elastic member can provide an elastic restoring force (i.e., a winding force indirectly acting on the flexible screen 220) to the rotation shaft 212 when the rotation shaft 212 rotates along with extension of the flexible screen 220. According to such design, when a pulling force for stretching the flexible screen 220 disappears, for example, when the user releases his hand, or when the folding bracket is no longer to support, the rotation shaft 212 can rotate under the elastic restoring force to draw in the flexible screen 220. In addition, while the flexible screen 220 is drawn in, the driving mechanism drives the rotation shaft 212 to slide along the groove 2112, and a sliding direction of the rotation shaft 212 when the flexible screen is drawn in is opposite to a sliding direction of the rotation shaft 212 when the flexible screen 220 is drawn out, so as to always ensure that the flexible screen 220 does not contact with the inner surface or the opening 2111 of the shell 211.

Furthermore, based on the design that the reel-based display device includes an elastic member, in which embodiment, the elastic member may include a torsion spring, for example.

As shown in FIG. 5, in this embodiment, the flexible screen 220 may include a composite film layer 221 and a cover film 222, for example. Specifically, the composite film layer 221 includes a base film, a display screen, a touch screen, a polaroid, and an optical adhesive layer sequentially laminated. The cover film 222 is disposed on one side of the optical adhesive layer facing away from the polaroid. The cover film 222 may be made of, for example colorless polyimide (CPI), coated with a film to be strengthened. The optical adhesive layer may be, for example OCA optical adhesive.

Furthermore, as shown in FIG. 5, based on the aforesaid laminated structure of the flexible screen 220, in this embodiment, a size of the cover film 222 is larger than a size of the composite film 221 in the short-side direction, that is, perpendicular to the stretching direction or in the first direction F1, and both ends of the cover film 222 in the short-side direction respectively exceed the composite film 221. Both end portions of the cover film 222 exceeding the composite film layer 221 are respectively provided with adhesive layers 223. The adhesive layers 223 and the composite film layer 221 are on the same side of the cover film 222. The adhesive layer 223 connects the connecting end a of the flexible screen 220 to the rotation shaft 212 at one end thereof in the longitudinal direction.

Furthermore, on the basis of the design of the adhesive layer 223, in this embodiment, when the retractable end b of the flexible screen 220 is provided with the handle structure 230, the adhesive layer 223 connects the handle structure 230 to the retractable end b of the flexible screen 220 at the other end thereof in the longitudinal direction.

Furthermore, on the basis of the design of the adhesive layer 223, the thickness of the adhesive layer 223 may be approximately equal to the overall thickness of the composite film layer 221, for example.

Herein, it should be noted that the reel type display device as shown in the drawings and as described in the specification is just one example of several reel type display devices that can employ a principle of the present disclosure. It should be clearly understood that the principle of the present disclosure is absolutely not only limited to any detail of the reel type display device as shown in the drawings or as described in the specification or any components of the reel type display device.

As above described, the present disclosure provides the reel type display device, in which the grooves are respectively formed at a position where the inner surface of the shell of the reel corresponds to the two end portions of the rotation shaft, and the extension direction of the grooves is relatively crossed with an opening direction of the reel. Two end portions of the rotation shaft are respectively in sliding fit with the two grooves. The driving mechanism drives the rotation shaft to slide along the groove according to the retractable state of the flexible screen, so that the portion of the flexible screen unwound on the rotation shaft is kept extending along the first direction. On the basis of such design, the reel type display device provided by the present disclosure can always keep the direction where the flexible screen is drawn out to be in consistent with the tangential direction (i.e., the first direction) of the rotation shaft, and the flexible screen is always kept in the middle position of the opening of the reel when the flexible screen is drawn out, thus preventing the local stress of the flexible screen at the tangent point from becoming greater and preventing the display surface from being scratched.

Exemplary embodiments of the absorption shielding means and the evaporation device having the absorption shielding means as proposed by the present disclosure are described and/or illustrated in detail. However, the embodiments of the present disclosure are not limited to the specific embodiments as described herein. Rather, the constituents and/or steps of each embodiment may be used independently and separately from the other constituents and/or steps as described herein. Each constituent and/or step of one embodiment may also be used in combination with other constituents and/or steps of the other embodiments. When the elements/constituents as described and/or illustrated herein are introduced, the terms "a", "an", "the", "said" and "at least one", are used to express the presence of one or more the element/constitute/or the like. The terms "comprise", "include" and "have" are intended to be inclusive, and mean there may be additional elements/constituents/or the like other than the listed elements/constituents/or the like. The "first" and "second" are used only as marks, and are not numerical restriction to the objects.

Although the reel type display device as proposed by the present disclosure is disclosed according to different particular embodiments, those skilled in the art would recognize that the implementations of present disclosure can be modified within the spirit and scope of the claims.

What is claimed is:

1. A reel type display device, comprising:
   a shell with an accommodating space and an opening;
   a rotation shaft rotatably disposed in the accommodating space of the shell;
   a flexible screen having a connecting end connected to the rotation shaft and a retractable end configured to be retractable relative to the opening; and
   a driving mechanism;
   wherein two grooves opposite to each other are on an inner surface of the shell, the two grooves extend along a second direction, and two end portions of the rotation shaft are in sliding fit with the two grooves, respectively; and
   wherein the driving mechanism is configured to drive the rotation shaft to translate along the two grooves according to a retractable state of the flexible screen, so that a portion of the flexible screen unwound from the rotation shaft extends along a first direction, wherein the second direction is perpendicular to a central axis direction of the rotation shaft.

2. The reel type display device according to claim 1, wherein the first direction is perpendicular to the second direction.

3. The reel type display device according to claim 1, wherein a length of the groove in the second direction is equal to or slightly greater than or slightly less than an overall thickness of the flexible screen, and the overall thickness is a sum of thicknesses of layers of the flexible screen overlapped to one another after the flexible screen is completely wound on the rotation shaft.

4. The reel type display device according to claim 1, wherein each of the two grooves has a first end and a second end in the second direction, and the first end is at a center line of the shell.

5. The reel type display device according to claim 4, wherein the second end is on a side of the center line of the shell facing the opening.

6. The reel type display device according to claim 1, wherein the shell comprises:
   a tube having two end portions; and
   two end plates respectively and fixedly connected with the two end portions of the tube, wherein the two grooves are on the two end plates, respectively.

7. The reel type display device according to claim 1, further comprising: an extension tube extending along the first direction and having two ends and; wherein one end of the extension tube connects with the shell and communicates with the accommodating space, and the other end is an opening end; the opening is at the opening end of the extension tube.

8. The reel type display device according to claim 1, wherein:
   the two end portions of the rotation shaft are made of magnetic materials; and
   the driving mechanism comprises a magnetic assembly configured to control the two end portions of the rotation shaft to slide along the two grooves by a magnetic field.

9. The reel type display device according to claim 1, further comprising: an elastic member connected between the rotation shaft and the shell, wherein the elastic member is configured to provide elastic restoring force when the rotation shaft rotates along with extension of the flexible screen.

10. The reel type display device according to claim 9, wherein the elastic member comprises a torsion spring.

11. The reel type display device according to claim 1, wherein the flexible screen comprises:
    a composite film layer comprising a bottom film, a display screen, a touch screen, a polaroid, and an optical adhesive layer sequentially laminated; and
    a cover film on a side of the optical adhesive layer facing away from the polaroid.

12. The reel type display device according to claim 11, wherein:
    an area of the cover film is larger than an area of the composite film layer, such that the cover film extends out of edges of the composite film layer respectively on both sides of the first direction;
    the portions of the cover film extending out of the composite film layer are respectively provided with adhesive layers;
    the adhesive layers and the composite film layer are positioned on the same side of the cover film; and
    one end of the adhesive layer connects the connecting end of the flexible screen to the rotation shaft.

13. The reel type display device according to claim 11, wherein:
    an area of the cover film is larger than an area of the composite film layer;
    the cover film extends out of edges of the composite film layer respectively on both sides of the first direction;
    the reel type display device further comprises a handle structure at a retractable end of the flexible screen;

the portions of the cover film extending out of the composite film layer are respectively provided with adhesive layers; and one end of the adhesive layer connects the handle structure to the retractable end of the flexible screen.

14. The reel type display device according to claim 1, further comprising:

a folding bracket foldably disposed between the retractable end of the flexible screen and the shell, wherein the folding bracket is configured to support a portion of the flexible screen extending out of the opening; or a handle structure at the retractable end of the flexible screen.

15. A reel structure comprising:

a shell with an accommodating space and an opening; and a rotation shaft rotatably disposed in the accommodating space of the shell;

wherein two grooves opposite and parallel to one another are on an inner surface of the shell, and two end portions of the rotation shaft are respectively in sliding fit with the two grooves.

16. The reel structure according to claim 15, wherein each of the two grooves has a first end at a center line of the shell and a second end at a side of the center line of the shell facing the opening.

17. The reel structure according to claim 15, wherein the shell comprises:

a tube; and two end plates respectively and fixedly connected with two end portions of the tube, wherein the two grooves are on the two end plates, respectively.

18. The reel structure according to claim 15, further comprising: an extension tube, having one end connected with the shell and communicated with the accommodating space, and the other end being an opening end, wherein the extension tube extends away from the shell, and the opening is at the opening end of the extension tube.

19. The reel structure according to claim 15, further comprising: an elastic member connected between the rotation shaft and the shell, the elastic member being configured to provide an elastic restoring force.

20. The reel structure according to claim 15, wherein the end portions of the rotation shaft are made of magnetic materials, and the driving mechanism comprises a magnetic assembly configured to control the two end portions of the rotation shaft to slide along the two grooves by a magnetic field.

* * * * *